(12) United States Patent
Arai et al.

(10) Patent No.: US 12,315,657 B2
(45) Date of Patent: May 27, 2025

(54) WIRING MEMBER

(71) Applicant: Sumitomo Wiring Systems, Ltd., Mie (JP)

(72) Inventors: Kenta Arai, Mie (JP); Daisuke Ebata, Mie (JP); Ryusuke Kudo, Mie (JP); Masaki Mizushita, Mie (JP); Tetsuya Nishimura, Mie (JP); Haruka Nakano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 122 days.

(21) Appl. No.: 17/802,372

(22) PCT Filed: Feb. 10, 2021

(86) PCT No.: PCT/JP2021/004985
§ 371 (c)(1),
(2) Date: Aug. 25, 2022

(87) PCT Pub. No.: WO2021/172018
PCT Pub. Date: Sep. 2, 2021

(65) Prior Publication Data
US 2023/0079882 A1 Mar. 16, 2023

(30) Foreign Application Priority Data
Feb. 28, 2020 (JP) ................... 2020-033552

(51) Int. Cl.
*H01B 7/00* (2006.01)
*H02G 3/30* (2006.01)
*B60R 16/02* (2006.01)

(52) U.S. Cl.
CPC ............. *H01B 7/0045* (2013.01); *H02G 3/30* (2013.01); *B60R 16/0207* (2013.01)

(58) Field of Classification Search
CPC ... B60R 6/0207; B60R 6/0215; H01B 7/0045; H01B 7/40; H02G 3/04; H02G 3/30; H02G 3/32; H02G 3/305; H02G 3/266
See application file for complete search history.

(56) References Cited

U.S. PATENT DOCUMENTS

| 5,276,759 A | * | 1/1994 | Nguyen | ............... | G02B 6/4403 |
| | | | | | 174/121 R |
| 5,502,287 A | * | 3/1996 | Nguyen | ............... | H01B 7/0846 |
| | | | | | 174/117 A |

(Continued)

FOREIGN PATENT DOCUMENTS

| CN | 110785904 | 2/2020 |
| JP | 2009-503211 | 1/2009 |

(Continued)

OTHER PUBLICATIONS

Japan Office Action issued in Japan Patent Application No. 2020-33552, dated May 23, 2023, together with English translation thereof.

International Search Report issued in International Patent Application No. PCT/JP2021/004985, dated Apr. 20, 2021, along with an English translation thereof.

(Continued)

*Primary Examiner* — Paresh Paghadal
(74) *Attorney, Agent, or Firm* — Greenblum & Berstein, P.L.C.

(57) ABSTRACT

A wiring member includes a sheet including a fusion layer, an adhesive tape including an adhesive layer and a base material layer, and a first wire-like transmission member to which the adhesive tape is fixed via the adhesive layer. The base material layer and the fusion layer are fused to each other, and the first wire-like transmission member is fixed to the sheet via the adhesive tape.

6 Claims, 4 Drawing Sheets

(56) References Cited

U.S. PATENT DOCUMENTS

| | | | | |
|---|---|---|---|---|
| 5,702,994 | A | * | 12/1997 | Klosel .................... H02G 3/266 |
| | | | | 428/354 |
| 9,023,444 | B2 | * | 5/2015 | Tigerfeldt ............. F16L 59/029 |
| | | | | 156/60 |
| 10,297,370 | B1 | * | 5/2019 | Boecker .............. B29C 65/4845 |
| 2003/0207106 | A1 | * | 11/2003 | Nakamura ................ C09J 7/385 |
| | | | | 428/355 EN |
| 2008/0190544 | A1 | | 8/2008 | Hoph |
| 2008/0190661 | A1 | * | 8/2008 | O'Brien .............. B60R 16/0215 |
| | | | | 174/72 A |
| 2018/0258321 | A1 | * | 9/2018 | Huo ........................... C09J 7/35 |
| 2019/0341175 | A1 | * | 11/2019 | Hohmann ............... B32B 15/12 |
| 2019/0375348 | A1 | * | 12/2019 | Mizuno ............... B60R 16/0215 |
| 2019/0392963 | A1 | | 12/2019 | Ishida et al. |
| 2020/0172027 | A1 | | 6/2020 | Mizuno et al. |
| 2021/0024020 | A1 | | 1/2021 | Nishimura et al. |
| 2021/0309168 | A1 | * | 10/2021 | Kisu ...................... H02G 3/305 |

FOREIGN PATENT DOCUMENTS

| | | | |
|---|---|---|---|
| JP | 2012-3967 | 1/2012 | |
| JP | 2015-90783 | 5/2015 | |
| JP | 2018-137208 | 8/2018 | |
| JP | 2019-003925 | 1/2019 | |
| WO | WO-2010066646 A2 * | 6/2010 | ............ B29C 65/18 |
| WO | 2020/039914 | 2/2020 | |

OTHER PUBLICATIONS

International Preliminary Report on Patentability issued in International Patent Application No. PCT/JP2021/004985, dated Sep. 1, 2022, along with an English translation thereof.

China Office Action issued in China Patent Application No. 202180016253.6, dated Mar. 6, 2024, together with English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that a plural types of electrical wire are simply welded to a sheet-like functional exterior member.

Accordingly, an object is to provide a technique capable of simply fusing a wire-like transmission member to a sheet regardless of a type of the wire-like transmission member.

Means to Solve the Problem

A wiring member according to the present disclosure is a wiring member including: a sheet including a fusion layer; an adhesive tape having an adhesive layer and a base material layer; and a first wire-like transmission member to which the adhesive tape is fixed via the adhesive layer, wherein the base material layer and the fusion layer are fused to each other, and the first wire-like transmission member is fixed to the sheet via the adhesive tape.

Effects of the Invention

According to the present disclosure, a wire-like transmission member can be simply fused to a sheet regardless of a type of the wire-like transmission member.

DESCRIPTION OF EMBODIMENT(S)

Description of Embodiment of Present Disclosure

Figure 1:
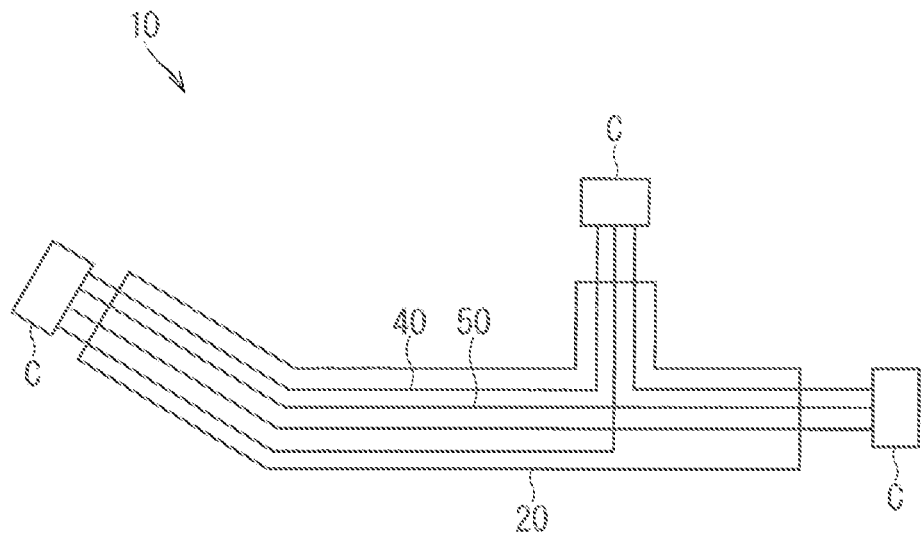
FIG. 1 is a schematic plan view illustrating a wiring member according to an embodiment 1.

Embodiments of the present disclosure are listed and described firstly.

A wiring member according to the present disclosure is as follows.

(1) A wiring member includes: a sheet including a fusion layer; an adhesive tape including an adhesive layer and a base material layer; and a first wire-like transmission member to which the adhesive tape is fixed via the adhesive layer, wherein the base material layer and the fusion layer are fused to each other, and the first wire-like transmission member is fixed to the sheet via the adhesive tape. The base material layer and the fusion layer are fused to each other, and the adhesive tape is attached to the first wire-like transmission member via the adhesive layer, thus the first wire-like transmission member can be simply fused to the sheet regardless of a type of the wire-like transmission member.

(2) In the wiring member according to (1), it is also applicable that the first wire-like transmission member includes a first transmission wire body and a first covering layer, and when the fusion layer is fused to each of the base material layer and the first covering layer in an identical condition, fusion strength between the fusion layer and the base material layer is larger than fusion strength between the fusion layer and the first covering layer. Accordingly, the first wire-like transmission member including the first covering layer having small fusion strength with the fusion layer is easily fused and fixed to the sheet.

(3) In the wiring member according to (1) or (2), it is also applicable that the first wire-like transmission member includes a first transmission wire body and a first covering layer, the base material layer and the fusion layer are made of polyvinyl chloride, and a material constituting the first covering layer is different from polyvinyl chloride. Accordingly, the first wire-like transmission member including the first covering layer formed of a material different from polyvinyl chloride is easily fused and fixed to a sheet made of polyvinyl chloride.

(4) In the wiring member according to any one of (1) to (3), the first wire-like transmission member may be a twisted wire. Accordingly, the first wire-like transmission member as a twisted wire is easily fused and fixed to the sheet.

(5) It is also applicable that the wiring member according to any one of (1) to (4) further includes a second wire-like transmission member including a second transmission wire body and a second covering layer, wherein the second covering layer is fused to the fusion layer, and the second wire-like transmission member is fixed to the sheet. Accordingly, the first wire-like transmission member and the second wire-like transmission member are fixed to the same sheet.

(6) In the wiring member according to any one of (1) to (5), the adhesive tape may be provided on a part of the first wire-like transmission member along a longitudinal direction. Accordingly, a used amount of the tape is reduced.

(7) In the wiring member according to (6), a part of the base material layer along the longitudinal direction of the first wire-like transmission member may be fused to the fusion layer. Accordingly, the base material layer and the fusion layer are reliably fused to each other easily.

(8) In the wiring member according to any one of (1) to (7), wherein a part of the adhesive tape may be attached to another part of the adhesive tape while the adhesive tape is provided over a whole area of the first wire-like transmission member along a circumferential direction. Accordingly, the adhesive tape is hardly detached from the first wire-like transmission member.

(9) In the wiring member according to any one of (1) to (8), a part of the base material layer located between the first wire-like transmission member and the sheet may be fused to the fusion layer. Accordingly, increase in a region necessary for fusing the first wire-like transmission member along a width direction of the sheet is suppressed.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
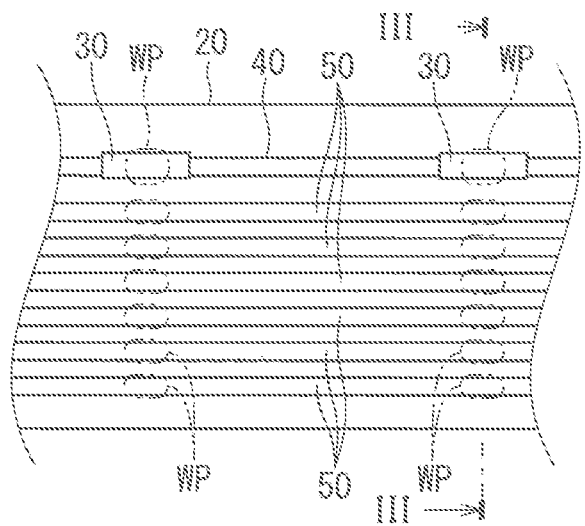
FIG. 2 is a partial enlarged view of FIG. 1.
Figure 3:
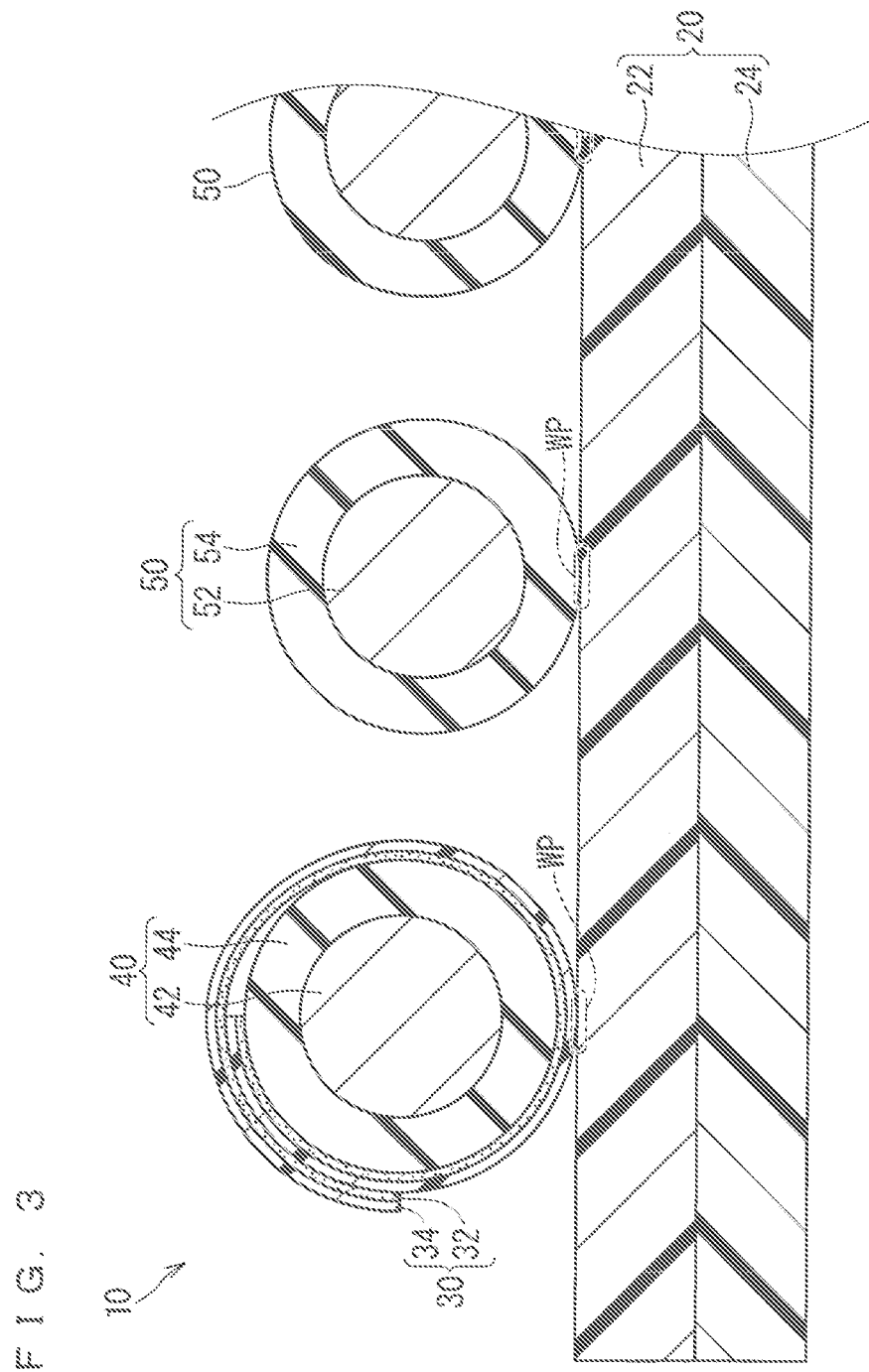
FIG. 3 is a cross-sectional view of the wiring member cut along a III-III line in FIG. 2.

A wiring member according to an embodiment 1 is described hereinafter. FIG. 1 is a schematic plan view illustrating a wiring member 10 according to the embodiment 1. FIG. 2 is a partial enlarged view of FIG. 1. FIG. 3 is a cross-sectional view of the wiring member 10 cut along a III-III line in FIG. 2. A portion illustrated by a virtual line in FIG. 2 and FIG. 3 are fusion part WP.

The wiring member 10 includes a sheet 20, an adhesive tape 30, and a first wire-like transmission member 40. Herein, the wiring member 10 further includes a second wire-like transmission member 50. The first wire-like transmission member 40 and the second wire-like transmission member 50 are fixed to the sheet 20. A fixing state of being fixed to the sheet 20 is different between the first wire-like transmission member 40 and the second wire-like transmission member 50.

The sheet 20 includes a fusion layer 22. The fusion layer 22 includes a resin material, or preferably includes a thermoplastic resin material. The resin material of the fusion layer 22 is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer 22 is not particularly limited. For example, the fusion layer 22 may be a sheet having an evenly filled cross-sectional surface (also referred to as a non-foam sheet or a solid sheet, for example). The fusion layer 22 is also considered a foam sheet, for example. The fusion layer 22 is also considered a fibrous material sheet such as a braided cloth, a woven cloth, or a non-woven cloth, for example.

The sheet 20 may also have a single layer structure made up of the fusion layer 22. The sheet 20 may also have a multilayer structure. When the sheet 20 has the multilayer structure, the fusion layer 22 is preferably located at least on one main surface of the sheet 20. Herein, the sheet 20 includes a first layer 22 and a second layer 24. The first layer 22 is the fusion layer 22. The wire-like transmission members 40 and 50 are fixed to the first layer 22. One surface of the first layer 22 is one main surface of the sheet 20.

The second layer 24 is formed of a material different from that of the fusion layer 22, or has a different structure. The second layer 24 increases a function of the fusion layer 22, or adds a function which the fusion layer 22 does not have to the sheet 20. A material constituting the second layer 24 is a material described for the fusion layer 22 described above or metal, for example. A structure of the second layer 24 may be any of the structure described for the fusion layer 22 described above. One surface of the second layer 24 is the other main surface of the sheet 20.

The first layer 22 and the second layer 24 are fixed to each other while the other surface of the first layer 22 and the other surface of the second layer 24 have contact with each other. A fixing state of the first layer 22 and the second layer 24 is not particularly limited, however, fixing by fusion or adhesion is preferable. For example, when at least one of the first layer 22 and the second layer 24 is a sheet having voids in a surface such as a fibrous material sheet or a foam sheet, a resin material or an adhesive agent enters the voids and the layers can be fixed to each other. Such a configuration causes so-called anchor effect, thus the first layer 22 and the second layer 24 are rigidly fixed.

In the description herein, the first layer 22 is a solid sheet made of resin and the second layer 24 is a fibrous material sheet. In the description herein, the first layer 22 and the second layer 24 are fused to each other. That is to say, the resin of the first layer 22 enters between the fibers of the second layer 24 while having flowability, and is then hardened. Maintained accordingly is a state where the resin of the first layer 22 enters between the fibers of the second layer 24, and the first layer 22 and the second layer 24 are rigidly fixed to each other.

The first layer 22 and the second layer 24 are formed to have the same size (the same planar shape). One of the first layer 22 and the second layer 24 may also be formed to be larger than the other one thereof. The first layer 22 and the second layer 24 are wholly fixed at a region where they have contact with each other. The first layer 22 and the second layer 24 may also be fixed only at a part of a region where they have contact with each other.

The sheet 20 may be a flexible member. For example, the first layer 22 is a resin layer having an evenly filled cross-sectional surface made up of flexible resin such as flexible PVC as a material, the second layer 24 is a non-woven cloth made up of PET as a material, and the sheet 20 is a flexible member. For example, the sheet 20 may have a plastic property so as to be able to follow bending of the wire-like transmission members 40 and 50. That is to say, it is also applicable that the wiring member 10 can be bended in a thickness direction (bending so that a fold line follows the main surface of the sheet 20).

The adhesive tape 30 includes an adhesive layer 32 and a base material layer 34. The adhesive tape 30 herein has a double layer structure of the adhesive layer 32 and the base material layer 34. The adhesive layer 32 constitutes one main surface of the adhesive tape 30, and the base material layer 34 constitutes the other main surface of the adhesive tape 30.

A type of the adhesive agent used for the adhesive layer 32 is not particularly limited. Herein, the adhesive layer 32 and the base material layer 34 are a combination in which they can be overlapped and attached to each other. The state of being overlapped and attached to each other indicates that the adhesive layer 32 is attached to the base material layer 34 while the adhesive layer 32 in the other portion of the adhesive tape 30 is overlapped with an outer surface of the base material layer 34 in a part of the adhesive tape 30.

The adhesive tape 30 is used for fixing the first wire-like transmission members 40 to the sheet 20. The second wire-like transmission member 50 is fixed to the sheet 20 without using the adhesive tape 30. A fixing state of the first wire-like transmission member 40 and the second wire-like transmission member 50 fixed to the sheet 20 is described in detail hereinafter.

The first wire-like transmission member 40 and the second wire-like transmission member 50 are wire-like members transmitting an electrical power or light, for example. The sheet 20 is formed into a flat shape as a whole. The plurality of wire-like transmission members 40 and 50 are fixed to the sheet 20, thus the wiring member 10 is kept in a flat state.

The plurality of wire-like transmission members 40 and 50 are assumed to be members connecting components in a vehicle. A connector C, for example, is provided on end portions of the wire-like transmission members 40 and 50. This connector C is connected to a connector provided in the other side component, thus the wire-like transmission members 40 and 50 are connected to the other side component. That is to say, the present wiring member 10 is used as the wiring member 10 electrically connecting various types of component in a vehicle, for example (or connecting them so that they can perform optical communication). The connector C may be fixed to the sheet 20.

Routes of the plurality of wire-like transmission members 40 and 50 are set in accordance with a position of a component to which the wire-like transmission members 40 and 50 are connected. The plurality of wire-like transmission members 40 and 50 are fixed to the sheet 20, thus the plurality of wire-like transmission members 40 and 50 are kept in a form following a wiring route corresponding to a position of a component as a connection destination of each of the wire-like transmission members 40 and 50. The plurality of wire-like transmission members 40 and 50 may be fixed to the sheet 20 in a state where a branch wire is branched from a main wire. The sheet 20 may also be formed into a shape in which a portion to which the branch wire is fixed is branched from a portion to which the main wire is fixed. Herein, the plurality of wire-like transmission members 40 and 50 are branched on the sheet 20.

Each of the wire-like transmission members 40 and 50 includes a transmission wire body and a covering layer. The transmission wire body transmits an electrical power or light, for example. The covering layer covers the transmission wire body. For example, each of the wire-like transmission members 40 and 50 may be a general wire having a core wire and a covering layer around the core wire, or may also be a shielded wire, a twisted wire, an enamel wire, a nichrome wire, or an optical fiber.

The wire-like transmission members 40 and 50 transmitting the electrical power may be various kinds of signal lines or various kinds of power lines. Some of the wire-like transmission members 40 and 50, for example, transmitting the electrical power may be used as an antenna or coil, for example, transmitting or receiving a signal or electrical power to or from a space.

The wire-like transmission members 40 and 50 may be a single wire-like object or a composite object of a plurality of wire-like objects (a twisted wire and a cable made up of a plurality of wire-like objects covered by a sheath).

The first wire-like transmission member 40 includes a first transmission wire body 42 and a first covering layer 44. The first covering layer 44 is a layer located on an outermost side of the first wire-like transmission member 40. The second wire-like transmission member 50 includes a second transmission wire body 52 and a second covering layer 54. The second covering layer 54 is a layer located on an outermost side of the second wire-like transmission member 50.

A resin material constituting the first covering layer 44 is a material different from a resin material constituting the fusion layer 22, a resin material constituting the base material layer 34, and a resin material constituting the second covering layer 54. A resin material constituting the fusion layer 22, a resin material constituting the base material layer 34, and a resin material constituting the second covering layer 54 are the same type of material.

For example, a resin material constituting the fusion layer 22, a resin material constituting the base material layer 34, and a resin material constituting the second covering layer 54 are PVC, and a material constituting the first covering layer 44 is a resin material different from PVC. In this case, the material constituting the first covering layer 44 is not particularly limited except for PVC, thus polyolefin such as PE and PP, silicone resin, or fluorine resin such as polytetrafluoroethylene, for example, is also applicable.

The resin material may be halogen-free. A halogen-free state indicates that chlorine and bromine in halogen are not contained or only a trace amount of halogen is contained. For example, in a standard of International Electrotechnical Commission (IEC), a case where a content rate of each of chlorine and bromine is equal to or smaller than 900 ppm and a total content rate of chlorine and bromine is equal to or smaller than 1500 ppm is defined as the halogen-free state. A halogen-free wire-like transmission member is also referred to as a zero-halogen wire (for example, a zero-halogen electrical wire in a case of an electrical wire).

A combination of materials constituting the fusion layer 22, the base material layer 34, the first covering layer 44, and the second covering layer 54 is not limited thereto described above. For example, it is also applicable that a resin material constituting the fusion layer 22, a resin material constituting the base material layer 34, and a resin material constituting the second covering layer 54 are PE, and a material constituting the first covering layer 44 is a resin material different from PE.

The first wire-like transmission member 40 is fixed to the sheet 20 using the adhesive tape 30. The adhesive tape 30 is attached to the first wire-like transmission member 40 and fused to the sheet 20, thus the first wire-like transmission member 40 is fixed to the sheet 20 via the adhesive tape 30. Specifically, the adhesive tape 30 is attached to the first wire-like transmission member 40 via the adhesive layer 32. The base material layer 34 and the fusion layer 22 are fused to each other, thus the adhesive tape 30 is fixed to the sheet 20.

An attachment state of attaching the adhesive tape 30 to the first wire-like transmission member 40 by the adhesive layer 32 is not particularly limited. Herein, the adhesive layer 32 and the first covering layer 44 is a combination in which the adhesive layer 32 can be attached to the first covering layer 44. The adhesive layer 32 is attached to an outer surface of the first covering layer 44, thus the adhesive tape 30 is attached to the first wire-like transmission member 40.

The adhesive tape 30 is provided over a whole area of the first wire-like transmission members 40 along a circumferential direction. The adhesive tape 30 is wound around the first wire-like transmission members 40 for one round or more. Accordingly, the adhesive tape 30 can be welded to the sheet 20 in any position of the first wire-like transmission member 40 along the circumferential direction.

The adhesive tape 30 may be provided in a part of the first wire-like transmission members 40 along the circumferential direction. That is to say, a part of the first covering layer 44 adjacent to a part thereof provided with the adhesive tape 30 along the circumferential direction may be exposed. In this case, an amount of increase in thickness of the first wire-like transmission member 40 caused by providing the adhesive tape 30 is suppressed compared with the case where the adhesive tape 30 is provided over a whole area of the first wire-like transmission members 40 along the circumferential direction.

The adhesive tape 30 is wound for more than one round, and a part of the adhesive tape 30 is attached to the other part thereof. Accordingly, even when adhesion strength between the adhesive layer 32 and the first covering layer 44 is small, the adhesive tape 30 is hardly detached from the first wire-like transmission member 40. Even when the adhesive layer 32 is not attached to the first covering layer 44, the adhesive tape 30 is attached to the first wire-like transmission member 40 via the adhesive layer 32. Herein, the adhesive tape 30 is overlapped and attached spirally so that a winding end of the adhesive layer 32 is attached to a winding start of the outer surface of the base material layer 34. In the example illustrated in FIG. 3, the adhesive tape 30 is wound for more than one round and two rounds or less. The adhesive tape 30 may be wound for more than two rounds and three rounds or less, or may also be wound for more than three rounds. As an amount of winding of the adhesive tape 30 increases, the adhesive tape 30 is further hardly detached from the first wire-like transmission member 40. As an amount of winding of the adhesive tape 30 decreases, an amount of increase in thickness of the first wire-like transmission member 40 caused by providing the adhesive tape 30 is suppressed.

The adhesive tape 30 is wound at a certain position. A state of winding at a certain position indicates a winding state where an adhesive tape is wound so that a side edge of a winding start and a side edge of a winding end are aligned. The adhesive tape 30 may be spirally wound. A state of spiral winding indicates a winding state where an adhesive tape is spirally wound so that a side edge of a winding start in the adhesive tape 30 and a side edge of a winding end therein deviate from each other along a longitudinal direction of the first wire-like transmission member 40.

The adhesive tape 30 may be provided in a part of the first wire-like transmission members 40 along the longitudinal direction. Herein, the adhesive tape 30 is provided in a plurality of positions at intervals in the first wire-like transmission members 40 along the longitudinal direction.

A part of the base material layer 34 in the adhesive tape 30 is directed to the sheet 20. A part of the base material layer 34 directed to the sheet 20 is fused to the fusion layer 22. Herein, when the wiring member 10 is observed along a width direction as illustrated in FIG. 3, a part of the base material layer 34 located between the first wire-like transmission member 40 and the sheet 20 is fused to the fusion layer 22. Accordingly, the fusion part WP is located in a portion where the first wire-like transmission member 40 and the sheet 20 are overlapped with each other.

When the fusion layer 22 is fused to the base material layer 34 and the first covering layer 44 in the same condition, fusion strength between the fusion layer 22 and the base material layer 34 is larger than that between the fusion layer 22 and the first covering layer 44. A resin material constituting the fusion layer 22 is different from that constituting the first covering layer 44, and is the same type as that constituting the base material layer 34, thus fusion strength between the fusion layer 22 and the base material layer 34 is larger than that between the fusion layer 22 and the first covering layer 44. Herein, the fusion strength in the present specification can be evaluated using results separately tested in the same type of detachment test (for example, each test of JIS K6854), for example.

The second covering layer 54 is fused to the fusion layer 22, thus the second wire-like transmission member 50 is fixed to the sheet 20. A resin material constituting the fusion layer 22 is different from that constituting the first covering layer 44, and is the same type as that constituting the second covering layer 54, thus fusion strength between the fusion layer 22 and the second covering layer 54 is larger than that between the fusion layer 22 and the first covering layer 44.

A means of forming the fusion state is not particularly limited. Adoptable are various types of fusion means such as ultrasonic fusion, heating pressurizing fusion, hot air fusion, and high-frequency fusion. When the fusion state is formed by these means, the wire-like transmission members 40 and 50 and the sheet 20 are in a state of fusion fixation by those means. Specifically, when the wire-like transmission members 40 and 50 are fused to the sheet 20 by ultrasonic fusion, the fusion part WP is an ultrasonic fusion part, for example.

In the example illustrated in FIG. 2, the adhesive tape 30 is provided in a part of the first wire-like transmission members 40 along the longitudinal direction. The adhesive tape 30 is provided in a plurality of positions at intervals in the first wire-like transmission members 40 along the longitudinal direction. The base material layer 34 of each adhesive tape 30 is fused to the fusion layer 22. Thus, the first wire-like transmission members 40 is fused and fixed to the sheet 20 in a plurality of positions at intervals along the longitudinal direction.

In each adhesive tape 30, when the wiring member 10 is observed along the longitudinal direction as illustrated in FIG. 2, a part of the base material layer 34 along the longitudinal direction of the first wire-like transmission member 40 is fused to the fusion layer 22. That is to say, each adhesive tape 30 is not fused to a whole area in the sheet 20 along the longitudinal direction of the first wire-like transmission member 40. Each adhesive tape 30 includes a portion not fused to the fusion layer 22 along the longitudinal direction of the first wire-like transmission member 40.

However, the adhesive tape 30 may be sequentially provided in a whole area along a direction in which the first wire-like transmission members 40 extends. In this case, the adhesive tape 30 may be sequentially fused to a whole area in the sheet 20 along the longitudinal direction, or may also be fused to the sheet 20 in a plurality of positions at intervals along the longitudinal direction.

In the example illustrated in FIG. 2, the second wire-like transmission member 50 is fused to the sheet 20 in a plurality of positions at intervals along the longitudinal direction. The second wire-like transmission member 50 may be sequentially fixed to the sheet 20 along the longitudinal direction.

In the example illustrated in FIG. 2, the first wire-like transmission member 40 and the second wire-like transmission member 50 are fused to the sheet 20 in the same position along the longitudinal direction in a parallel section. However, the first wire-like transmission member 40 and the second wire-like transmission member 50 may be fused to the sheet 20 in different positions along the longitudinal direction in a parallel section.

In the example illustrated in FIG. 2, one first wire-like transmission member 40 is provided. The plurality of first wire-like transmission members 40 may be provided. It is sufficient that at least one first wire-like transmission member 40 is provided. When the plurality of first wire-like transmission members 40 are provided, the first covering layers 44 of all of the first wire-like transmission members 40 may be made up of the same type of resin material. For example, a resin material constituting the first covering layers 44 of all of the wire-like transmission members 40 may be PE. A resin material constituting the first covering layer 44 of some first wire-like transmission member 40 and a resin material constituting the first covering layer 44 of the other some first wire-like transmission member 40 may be different from each other. For example, the first wire-like transmission member 40 with the first covering layer 44 made of PE and the first wire-like transmission member 40 with the first covering layer 44 made of fluorine resin may be provided.

The plurality of second wire-like transmission members 50 are included. Only one second wire-like transmission member 50 may be included. When the wiring member 10 includes the second wire-like transmission member 50, it is sufficient that at least one second wire-like transmission member 50 is included. The second wire-like transmission member 50 may be omitted.

In the example illustrated in FIG. 2, the number of the second wire-like transmission members 50 is larger than that of the first wire-like transmission members 40. The number of the second wire-like transmission members 50 may be equal to or smaller than that of the first wire-like transmission members 40. When the wire-like transmission members 40 and 50 are classified according to a resin material, that is to say, when the first wire-like transmission member 40 is segmentalized according to a resin material in addition to the classification of the first wire-like transmission member 40 and the second wire-like transmission member 50, the number of the second wire-like transmission members 50 is preferably largest in all types of wire-like transmission members 40 and 50. Accordingly, the number of the first wire-like transmission members 40 fused and fixed to the sheet 20 via the adhesive tape 30 can be reduced, thus the wiring member 10 is easily manufactured.

In the example illustrated in FIG. 2, the first wire-like transmission member 40 is located on an outermost side along a parallel direction of the plurality of wire-like transmission members 40 and 50. The first wire-like transmission member 40 is located on an outer side of the plurality of second wire-like transmission member 50. The first wire-like transmission member 40 may be located in an intermediate portion along a parallel direction of the plurality of wire-like transmission members 40 and 50. The first wire-like transmission member 40 may be located between the plurality of second wire-like transmission members 50.

When the plurality of first wire-like transmission members 40 are parallelly arranged, the plurality of first wire-like transmission members 40 may be parallelly arranged at a position adjacent to each other without sandwiching the second wire-like transmission member 50 therebetween. The plurality of first wire-like transmission members 40 may be parallelly arranged while sandwiching the second wire-like transmission member 50. Two first wire-like transmission members 40 may be located on an outermost side in both sides of the plurality of wire-like transmission members 40 and 50 along the parallel direction.

In the example illustrated in FIG. 2, the plurality of wire-like transmission members 40 and 50 having the same diameter are disposed on one sheet 20. However, diameters of the plurality of wire-like transmission members 40 and 50 may be appropriately set, and the wire-like transmission members 40 and 50 having different diameters may be disposed in the same sheet 20.

Figure 4:
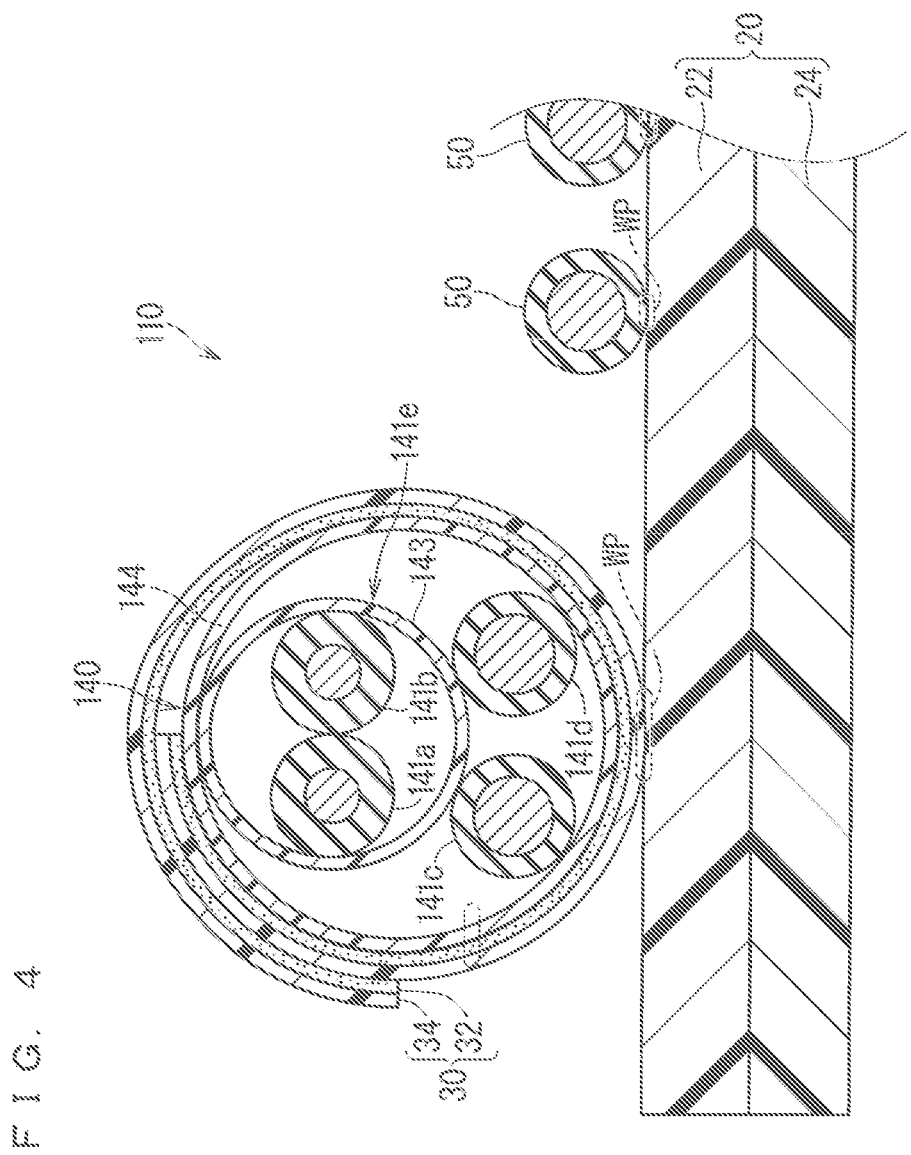
FIG. 4 is a cross-sectional view illustrating a modification example of the wiring member.

As with a wiring member 110 illustrated in FIG. 4, for example, a diameter of a first wire-like transmission member 140 may be larger than a diameter of at least some second wire-like transmission member 50. In the example illustrated in FIG. 4, the first wire-like transmission member 140 is a cable such as an USB cable (also referred to as a multicore wire), and the second wire-like transmission member 50 is a single core wire, thus the diameter of the first wire-like transmission member 140 is larger than that of some second wire-like transmission member 50.

A cable 140 illustrated in FIG. 4 includes four covering electrical wires 141a, 141b, 141c, and 141d. Two covering electrical wires 141a and 141b in four covering electrical wires 141a, 141b, 141c, and 141d are collected by a sheath 143 to be a cable 141e. The two covering electrical wires 141c and 141d and one cable 141e are collected by a sheath 144 to be a cable 140. The sheath 144 is the first covering layer 144 in the cable 140. The first transmission wire body is a core wire of each of the covering electrical wires 141a, 141b, 141c, and 141d in the cable 140.

The first wire-like transmission member 40 includes a shield layer, thus the diameter of the first wire-like transmission member 40 may be larger than that of some second wire-like transmission member 50. A wire-like transmission member including a shield layer is also referred to as a shield wire or a coaxial wire. The shield layer is provided between the first transmission wire body 42 and the first covering layer 44 in the first wire-like transmission member 40. An insulating layer is normally provided between the shield layer and the first transmission wire body 42. The shield layer may be provided on the cable 140.

Figure 5:
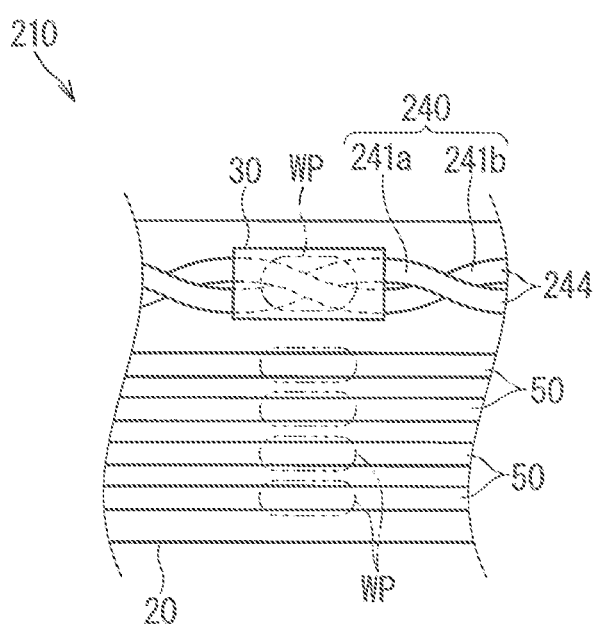
FIG. 5 is a cross-sectional view illustrating another modification example of the wiring member.

When the first wire-like transmission member has a multicore structure, a sheath as an outermost layer may not be provided. As with a wiring member 210 illustrated in FIG. 5, a first wire-like transmission member 240 may not be a twisted wire with no sheath. The twisted wire is made up of a plurality of twisted wire-like transmission members. A sheath is not provided around the plurality of twisted wire-like transmission members in the first wire-like transmission member 240. The first wire-like transmission member 240 illustrated in FIG. 5 is made up of the two twisted covering electrical wires 241a and 241b. A sheath is not provided around the two covering electrical wires 241a and 241b.

A covering layer 244 of the covering electrical wires 241a and 241b may be made up of the same material as the fusion layer 22 of the sheet 20, or may also be made up of a different material. A contact area between the two covering electrical wires 241a and 241b and the sheet 20 is smaller than that between one second wire-like transmission member 50 and the sheet 20. Thus, the twisted wire with no sheath is not fused to the sheet 20 more easily than the second wire-like transmission member 50 even when the covering layer of the covering electrical wires 241a and 241b is made up of the same material as the fusion layer 22 of the sheet 20. Even in this case, the first wire-like transmission member 240 as a twisted wire with no sheath is fused to the sheet 20 via the adhesive tape 30, thus is easily fused to the sheet 20.

A portion where the two covering electrical wires 241a and 241b are vertically arranged and a portion where they are laterally arranged are alternately provided in the first wire-like transmission member 240. Herein, a state of being vertically arranged indicates that the covering electrical wires are arranged in a direction away from a main surface of the sheet 20. A state of being laterally arranged indicates that the covering electrical wires are arranged along the main surface of the sheet 20. In a region between a portion where the covering electrical wires 241a and 241b are vertically arranged and a portion where they are horizontally arranged on the sheet 20, a half of the region on a side where they are vertically arranged is included in a vertical arrangement portion, and a half of the region on a side where they are horizontally arranged is included in a lateral arrangement portion.

A region where the adhesive tape 30 is provided in the first wire-like transmission member 240 is not particularly limited. For example, the adhesive tape 30 may be provided in the portion where the covering electrical wires 241a and 241b are vertically arranged on the sheet 20. The adhesive tape 30 may be provided in the portion where the covering electrical wires 241a and 241b are laterally arranged on the sheet 20. The adhesive tape 30 may be provided to cover both the vertical arrangement portion and the lateral arrangement portion. For example, when a width dimension of the adhesive tape 30 is equal to or larger than a pitch of a twisted wire, the adhesive tape 30 wound for one round covers both the vertical arrangement portion and the lateral arrangement portion.

A region fused to the sheet 20 in a portion where the adhesive tape 30 is provided in the first wire-like transmission member 240 is not particularly limited. For example, a portion where the covering electrical wires 241a and 241b are vertically arranged on the sheet 20 may be fused to the sheet 20. A portion where the covering electrical wires 241a and 241b are laterally arranged on the sheet 20 may be fused to the sheet 20. A portion including both the vertical arrangement portion and the lateral arrangement portion may be fused to the sheet 20.

The first wire-like transmission member may be a twisted wire with a sheath. Also in the twisted wire with a sheath, a portion where the covering electrical wires are laterally arranged and a portion where the covering electrical wires are vertically arranged occur. Thus, even when a material of a sheath as the first covering layer is the same as that of the fusion layer 22, the twisted wire with the sheath is not fused to the sheet 20 more easily than the second wire-like transmission member 50. Even in this case, the first wire-like transmission member as a twisted wire with a sheath is fused to the sheet 20 via the adhesive tape 30, thus is easily fused to the sheet 20.

Effect Etc. of Embodiment 1

According to the wiring members 10, 110, and 210 having the above configuration, the base material layer 34 and the fusion layer 22 are fused to each other, and the adhesive tape 30 is attached to the first wire-like transmission members 40, 140, and 240 via the adhesive layer 32, thus the first wire-like transmission members 40, 140, and 240 are fixed to the sheet 20 via the adhesive tape 30 which can be easily attached to the first wire-like transmission members 40, 140, and 240. Thus, the first wire-like transmission members 40, 140, and 240 can be simply fused to the sheet 20 regardless of a type of the wire-like transmission member.

When the fusion layer 22 is fused to the base material layer 34 and the first covering layers 44 and 144 in the same condition, fusion strength between the fusion layer 22 and the base material layer 34 is larger than that between the fusion layer 22 and the first covering layers 44 and 144. Accordingly, the first wire-like transmission members 40 and 140 including the first covering layers 44 and 144 having small fusion strength with the fusion layer 22 is easily fused and fixed to the sheet 20.

The base material layer 34 and the fusion layer 22 are made of polyvinyl chloride, and a material constituting the first covering layers 44 and 144 is different from polyvinyl chloride. Accordingly, the first wire-like transmission members 40 and 140 including the first covering layers 44 and 144 formed of a material different from polyvinyl chloride are easily fused and fixed to the sheet 20 made of polyvinyl chloride.

The second covering layer 54 is fused to the fusion layer 22, and the second wire-like transmission member 50 is fixed to the sheet 20, thus the first wire-like transmission members 40, 140, and 240 and the second wire-like transmission member 50 are fixed to the same sheet 20.

The adhesive tape 30 is provided in a part of the first wire-like transmission members 40, 140, and 240 along the longitudinal direction, thus a used amount of the adhesive tape 30 is reduced.

A part of the base material layer 34 along the first wire-like transmission members 40, 140, and 240 are fused to the fusion layer 22. A dimension of the base material layer 34 along the longitudinal direction of the first wire-like transmission members 40, 140, and 240 is larger than that of a fusion machine (for example, a horn of a ultrasonic fusion machine), thus a part of the base material layer 34 along the longitudinal direction of the first wire-like transmission members 40, 140, and 240 is fused to the fusion layer 22. The dimension of the base material layer 34 along the longitudinal direction of the first wire-like transmission members 40, 140, and 240 is larger than that of the fusion machine, thus even when a region where the fusion machine has contact with the base material layer 34 slightly deviates along the longitudinal direction of the first wire-like transmission members 40, 140, and 240, a region having a desired size can be fused. Accordingly, the base material layer 34 is reliably fused to the fusion layer 22 easily.

The adhesive tape 30 covers a whole periphery of the first wire-like transmission members 40, 140, and 240 and a part of the adhesive tape 30 is attached to the other part thereof, thus the adhesive tape 30 is hardly detached from the first wire-like transmission members 40, 140, and 240.

A part of the base material layer 34 located between the first wire-like transmission members 40, 140, and 240 and the sheet 20 is fused to the fusion layer 22, thus increase in a region necessary for fusing the first wire-like transmission members 40, 140, and 240 along the width direction of the sheet 20 is suppressed.

Modification Example

In the above description, a part of the base material layer 34 along the longitudinal direction of the first wire-like transmission members 40, 140, and 240 is fused to the fusion layer 22, however, this configuration is not necessary. A whole area of the base material layer 34 along the longitudinal direction of the first wire-like transmission members 40, 140, and 240 may be fused to the fusion layer 22.

In the above description, the base material layer 34 located in a part of the adhesive tape 30 between the first wire-like transmission members 40, 140, and 240 and the sheet 20 is fused to the fusion layer 22, however, this configuration is not necessary. For example, it is also applicable that the adhesive tape 30 includes a protruding part protruding to a lateral side of the first wire-like transmission members 40, 140, and 240, and the base material layer 34 in the protruding part is fused to the fusion layer 22. The protruding part may be provided on both lateral sides of the first wire-like transmission members 40, 140, and 240, or may also be provided only on one lateral side thereof.

The protruding part can be formed of the two adhesive tapes 30 longer than a half of a periphery of the first wire-like transmission members 40, 140, and 240 mutually sandwiching the first wire-like transmission members 40, 140, and 240 from sides opposite to each other. At this time, intermediate portions of the two adhesive tapes 30 mutually cover the first wire-like transmission members 40, 140, and 240 from sides opposite to each other. End portions of the two adhesive tapes 30 become the protruding parts when the adhesive layers 32 are attached to each other on one lateral side or both lateral sides of the first wire-like transmission members 40, 140, and 240. The protruding part can be formed by an intermediate portion of one adhesive tape 30 longer than a periphery of the first wire-like transmission members 40, 140, and 240 covering the first wire-like transmission members 40, 140, and 240 and the adhesive layers 32 on both end portions attached to each other on a lateral side of the first wire-like transmission members 40, 140, and 240. The protruding part is provided in such a manner, thus even in a case where the adhesive layer 32 is not attached to the first covering layers 44, 144, and 244, the adhesive tape 30 is attached to the first wire-like transmission members 40 and 140.

A primer may be applied to a surface of the base material layer 34 on a side of the adhesive layer 32 in the adhesive tape 30. A primer layer may be provided between the base material layer 34 and the adhesive layer 32. The primer layer is provided, thus the adhesive layer 32 is held by the base material layer 34 more favorably. The primer may be applied to the first covering layers 44, 144, and 244 before the adhesive layer 32 is attached to the first covering layers 44, 144, and 244. Accordingly, the adhesive tape 30 is held by the first wire-like transmission members 40, 140, and 240 more favorably. The other layer may be provided between the base material layer 34 and the adhesive layer 32 in the adhesive tape 30.

A peeling agent may be applied to a surface on an opposite side of the base material layer 34 from the adhesive layer 32 in the adhesive tape 30. The peeling agent is applied, thus when the adhesive tape 30 is let out of a tape winding body, a part of the adhesive layer 32 which is led out hardly remains on a portion of the base material layer 34 remaining on a side of the tape winding body, thus is detached more favorably. The tape winding body is a collected body of the adhesive tape 30, and is made up of the adhesive tape 30 spirally wound.

In a case where a peeling agent is applied to the surface of the base material layer 34 in the adhesive tape 30, even when a fusion operation is started in a state where the peeling agent intervenes between the base material layer 34 and the fusion layer 22, the base material layer 34 and the fusion layer 22 can be fused to each other. The reason is that a layer of the peeling agent is normally thin, thus is broken by heat or pressure at a time of fusion, thereby enabling the base material layer 34 and the fusion layer 22 to have contact with each other. Applicable as the peeling agent is, for example, resin having long-chain alkyl group, fluorine resin, or silicone resin, for example. The peeling agent may be thermoplastic resin. Accordingly, the peeling agent is easily melted by heat at the time of fusion, thus the base material layer 34 and the fusion layer 22 easily have contact with each other.

A color of the adhesive tape 30 (a color of the base material layer 34) and a color of the first covering layers 44, 144, and 244 may be the same as or different from each other. When the color of the adhesive tape 30 (a color of the base material layer 34) and the color of the first covering layers 44, 144, and 244 are different from each other, a position of the adhesive tape 30 is easily recognized in a case where the adhesive tape 30 is partially provided on the first wire-like transmission members 40, 140, and 240. Accordingly, suppressed is that the fusion machine is applied to a portion of the first wire-like transmission members 40, 140, and 240 where the adhesive tape 30 is not provided.

Each configuration described in the embodiment and each modification example can be appropriately combined as long as they are not contradictory.

EXPLANATION OF REFERENCE SIGNS 10, 110, 210 wiring member
20 sheet
22 first layer (fusion layer)
24 second layer
30 adhesive tape
32 adhesive layer
34 base material layer
40 first wire-like transmission member
42 first transmission wire body
44 first covering layer
140 first wire-like transmission member (cable)
141a, 141b, 141c, 141d covering electrical wire
141e cable
143 sheath
144 first covering layer (sheath)
240 first wire-like transmission member (twisted wire)
241a, 241b covering electrical wire
244 first covering layer (covering layer of each covering electrical wire)
50 second wire-like transmission member
52 second transmission wire body
54 second covering layer
C connector
WP fusion part

The invention claimed is:

1. A wiring member, comprising:
a sheet including a fusion layer;
an adhesive tape including an adhesive layer and a base material layer;
a first wire-like transmission member to which the adhesive tape is fixed via the adhesive layer; and
a plurality of second wire-like transmission members, each including a second transmission wire body and a second covering layer, wherein
the first wire-like transmission member includes a first transmission wire body,
the first transmission wire body is covered by a first covering layer,
the first covering layer covers all of the first transmission wire body,
the adhesive tape is wound around an outer surface of the first covering layer to be fixed to the first covering layer of the first wire-like transmission member via the adhesive layer,
the base material layer and the fusion layer are fused to each other,
the first wire-like transmission member is fixed to the sheet via the adhesive tape,
the second covering layer of each of the plurality of second wire-like transmission members is fused to the fusion layer,
the plurality of second wire-like transmission members are fixed to the sheet,
a material constituting the first covering layer is different from a material constituting the fusion layer, the base material layer, and the second covering layer, and
the material constituting the fusion layer, the base material layer, and the second covering layer are the same.

2. The wiring member according to claim 1, wherein the base material layer and the fusion layer are made of polyvinyl chloride, and a material constituting the first covering layer is different from polyvinyl chloride.

3. The wiring member according to claim 1, wherein the adhesive tape is provided on a part of the first wire-like transmission member along a longitudinal direction of the wiring member.

4. The wiring member according to claim 3, wherein a part of the base material layer along the longitudinal direction of the first wire-like transmission member is fused to the fusion layer.

5. The wiring member according to claim 1, wherein a part of the adhesive tape is attached to another part of the adhesive tape while the adhesive tape is provided over a whole area of the first wire-like transmission member along a circumferential direction.

6. The wiring member according to claim 1, wherein a part of the base material layer located between the first wire-like transmission member and the sheet is fused to the fusion layer.

\* \* \* \* \*